(12) United States Patent
Garnier

(10) Patent No.: US 9,361,261 B2
(45) Date of Patent: Jun. 7, 2016

(54) DEVICE FOR EXCHANGING DATA BETWEEN AT LEAST TWO APPLICATIONS

(76) Inventor: Christian Garnier, Etrechy (FR)

( * ) Notice: Subject to any disclaimer, the term of this patent is extended or adjusted under 35 U.S.C. 154(b) by 346 days.

(21) Appl. No.: 14/236,705

(22) PCT Filed: Jul. 24, 2012

(86) PCT No.: PCT/FR2012/000303
§ 371 (c)(1),
(2), (4) Date: Feb. 3, 2014

(87) PCT Pub. No.: WO2013/017744
PCT Pub. Date: Feb. 7, 2013

(65) Prior Publication Data
US 2014/0164665 A1    Jun. 12, 2014

(30) Foreign Application Priority Data

Aug. 1, 2011  (FR) .................................... 11 02398

(51) Int. Cl.
| G06F 13/14 | (2006.01) |
| G06F 13/40 | (2006.01) |
| G06F 21/60 | (2013.01) |
| H04L 12/40 | (2006.01) |
| G06F 13/38 | (2006.01) |

(52) U.S. Cl.
CPC .......... *G06F 13/4068* (2013.01); *G06F 21/606* (2013.01); *H04L 12/40026* (2013.01); *G06F 13/38* (2013.01)

(58) Field of Classification Search
CPC ... G06F 13/38; G06F 13/4068; G06F 21/606; G06F 9/444; H04L 12/40026
USPC .......................................................... 710/305
See application file for complete search history.

(56) References Cited

U.S. PATENT DOCUMENTS

| 2001/0044912 A1 | 11/2001 | Francis et al. |
| 2004/0064662 A1 | 4/2004 | Syed et al. |
| 2009/0193303 A1 | 7/2009 | Giles et al. |

OTHER PUBLICATIONS

International Search Report, dated Nov. 5, 2012, from corresponding PCT application.

*Primary Examiner* — Ernest Unelus
(74) *Attorney, Agent, or Firm* — Young & Thompson

(57) ABSTRACT

The present invention relates to devices for exchanging data between at least two data consuming and/or emitting applications A1, A2. The device has two modules 1, 2 with input/outputs 101, 201 connected to a corresponding application A1, A2 and each comprising two internal communication submodules 102, 103-202, 203 respectively for emission 102, 202 and for reception 103, 203; a control module 20; a synchronization clock 30; and a closed-loop transmission line 40, each submodule 102, 202 comprising an emission FSM circuit 104, 204 with an emission request output 105, 205 connected to the module 20, an emission authorization request input 106, 206 connected to an output of the module 20, and an output interface 108, 208 for data attached to the application A1, A2 that is linked therewith, each submodule 103, 203 comprising a reception FSM circuit 109, 209 with a reception request input 110, 210 connected to an output of the module 20 and an input interface 112, 212 for the data attached to the application A1, A2 that is linked therewith, means 50 also being provided for coupling the interfaces 108, 208-112, 212 with the transmission loop 40.

9 Claims, 2 Drawing Sheets

DEVICE FOR EXCHANGING DATA BETWEEN AT LEAST TWO APPLICATIONS

FIELD OF THE INVENTION

Figure 1:
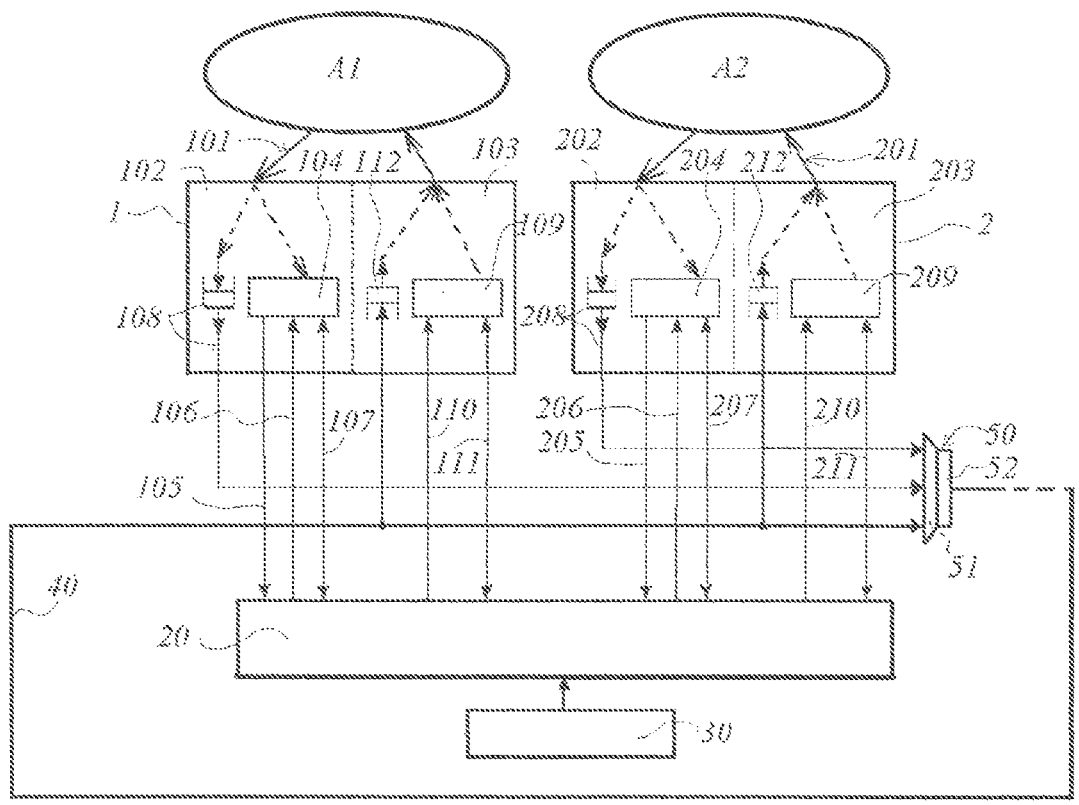

The present invention relates to devices for exchanging data of all kinds between at least two applications of any nature whatsoever.

BACKGROUND OF THE INVENTION

Such devices are already known, but they present drawbacks constituted essentially by: their lack of speed and of deterministic behavior in the exchanges they perform, and their lack of synchronization.

As examples, mention may be made of US-A-2004/064662, US-A-2009/193303, and US-A-2001/044912.

SUMMARY OF THE INVENTION

Thus, an object of the present invention is to provide a device for exchanging data between at least two applications, which device satisfies at least one of the following conditions:
  enabling communication at a very high data rate between the modules of a given component by giving each module the same probability of accessing a medium;
  controlling the medium in a manner that is deterministic and reliable by implementing a finite state machine (FSM) that manages the access instants and that natively incorporates a "bus guardian" type function for monitoring the operation of the device;
  providing secure communication (with an error probability of less than $10^{-9}$ per hour of operation) by implementing detection and repeat mechanism;
  managing data transfer with a very high level of quality of service (QoS);
  providing a behavior model making it possible to demonstrate the performance level of the device;
  providing an applicable "reliability of operation" model making it possible to guarantee the overall operating level of the device; and
  being easy to implement microelectronically by native segregation of functions that are interconnected by the device.

In addition, the structure of the device of the invention may be used in any component that needs to exchange data, in particular by the potential users for providing the connection as well as between processor cores and between processor cores and external applications, or indeed within very high data rate routers.

More precisely, the present invention provides a device for exchanging data between at least two data consuming and/or emitting applications, the device being characterized by the fact that it comprises:
  at least first and second modules, each module having I/O means suitable for being connected to an application, each module also having two internal communication submodules having respectively an emission function and a reception function;
  a control module;
  a clock for synchronizing the control module; and
  a closed-loop transmission line; and by the fact that:
  each internal communication submodule having an emission function comprises:
    an emission finite state machine (FSM) circuit comprising means for outputting an emission request, which means are connected to input means of said control module, emission authorization request input means connected to output means of said control module, and
    an output interface for the data associated with the application that is linked thereto; and that:
  each internal communication submodule having a reception function comprises:
    a reception finite state machine circuit comprising reception request input means for the submodule connected to output means of said control module; and
    an input interface for the data associated with the application that is linked therewith; and that it further comprises:

BRIEF DESCRIPTION OF THE DRAWINGS means for coupling the two input and output interfaces respectively of the submodules with said transmission loop.

Figure 2:
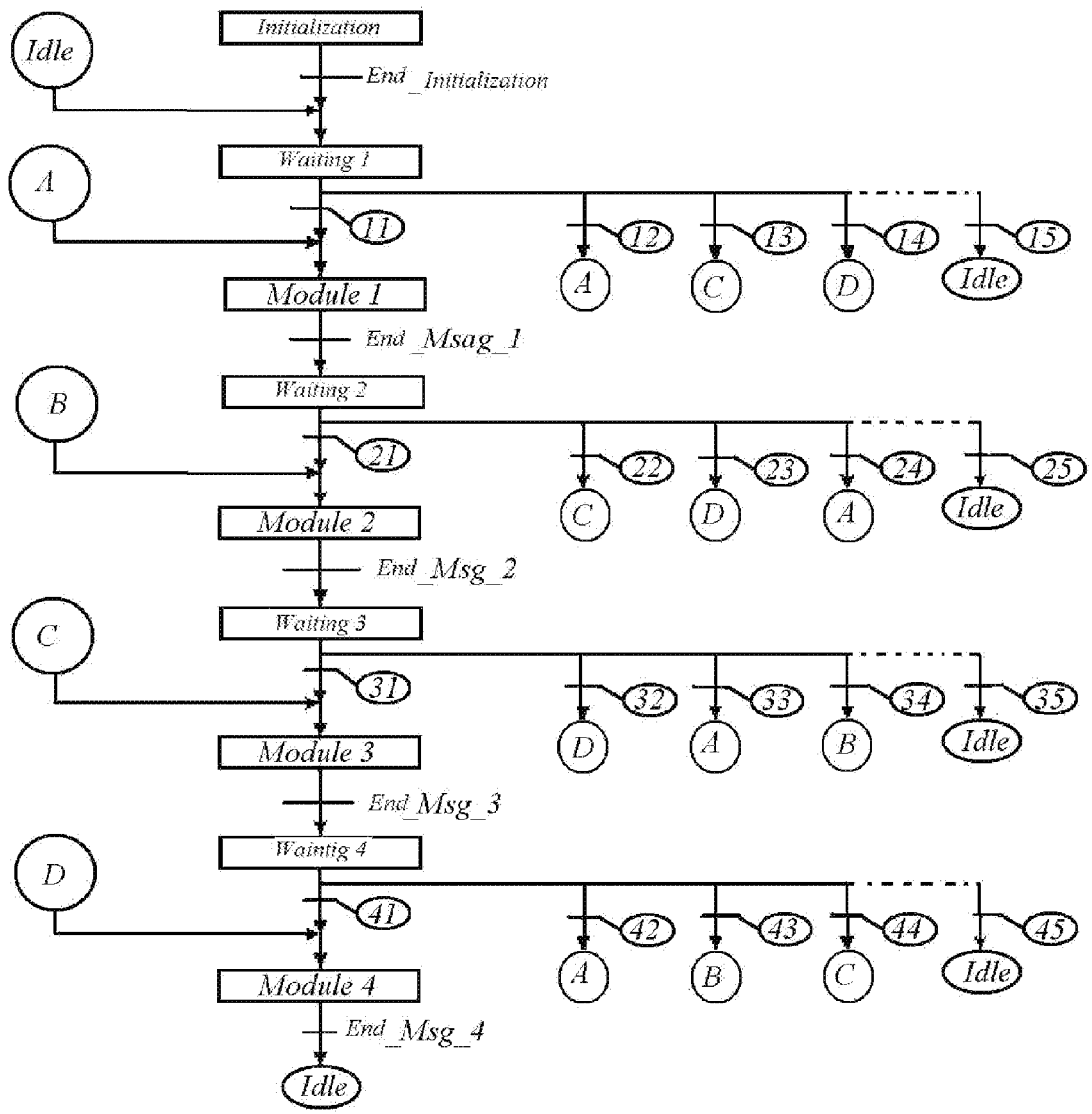

Other characteristics and advantages of the present invention appear from the following description given with reference to the accompanying drawings by way of non-limiting illustration, and in which:

FIG. 1 is a block diagram showing the principle of providing a device of the invention for exchanging data between at least two applications; and FIG. 2 shows an algorithm for illustrating an example of the operation of the device of the invention.

DETAILED DESCRIPTION OF THE INVENTION

The device of the invention for exchanging data between at least two data consuming and/or emitting applications A1, A2, . . . (see FIG. 1) comprises at least first and second modules 1, 2, . . . , each module including input/output (I/O) means 101, 201 suitable for being connected to an application A1, A2. Each module also has two internal communication submodules 102, 103-202, 203, respectively having an emission function 102, 202 or a reception function 103, 203. The device also has a control module 20, a clock 30 for synchronizing the control module, and a closed-loop transmission line 40.

Each of the two internal communication submodules 102, 202 having an emission function comprises an emission finite state machine (FSM) circuit 104, 204 comprising: i) means for outputting an emission request connected to input means 105, 205 of the control module 20; and ii) means 106, 206 for inputting an emission authorization request connected to output means of the control module 20, and an output interface 108, 208 for the data attached to the application A1, A2 that is linked thereto.

Each internal communication submodule 103, 203 having a reception function comprises a reception finite state machine (FSM) circuit 109, 209 having reception request input means 110, 210 connected to output means of the control module 20, and an input interface 112, 212 for the data attached to the application A1, A2 that is linked thereto.

Finally, in its first definition, the device also has means 50 for coupling the two output interfaces 108, 208 and the two input interfaces 112, 212 respectively of the submodules 102, 202-103, 203 with the transmission loop 40.

In a preferred embodiment, each of the two internal communication submodules 102, 202 having an emission function includes error management I/O means 107, 207 connected to I/O means of the control module 20, and each of the two internal communication submodules 103, 203 having a reception function includes error management request I/O means 111, 211 connected to I/O means of the control module 20.

In addition, advantageously, the means 50 for coupling the two output interfaces 108, 208 and the two input interfaces 112, 212 respectively of the submodules 102, 202-103, 203 with the transmission loop 40 include at least one multiplexer module 51 associated in known manner with a register 52. Preferably the multiplexer 51 has three inputs, two inputs connected respectively to the two output interfaces 108, 208 and to the two input interfaces 112, 212, and another input connected in series in the transmission loop 40.

The transmission loop 40 is advantageously constituted by an internal communication means (ICM) bus and the control module 20 is preferably a module for management by a finite state machine (FSM).

The use of the above-defined device is based on the fact that the closed-loop transmission line 40 has a pipelined ring structure enabling any module 1, 2, . . . to broadcast data in the form of messages to all of the other modules.

As a result, the emitter module can thus receive the emitted data. This function gives it the possibility of verifying that the data as transmitted via the closed-loop transmission line 40, or "pipeline", does indeed match the data emitted.

The entire management of the device is synchronized by a single clock, thus leading to many advantages. In addition, the clock is managed using one of the following techniques: static technique; dynamic technique; or a combination of the two preceding techniques.

In particular, synchronous communication presenting operation that is both scalable statically by definition of the reference clock for the operation of the system, and also dynamically as a function of the instantaneous volume of data to be exchanged over the transmission line, makes it possible to provide fine management over electricity consumption in the event of non-use since, in an "idle" mode, i.e. a mode waiting for one of the modules to emit a request, it is only the control FSM that is operating.

It is also possible to manage the reference clock dynamically as a function of external conditions (e.g. for a battery-powered processor, . . . ).

One of the advantages presented by the above-described structure of the means 50 for coupling the two output interfaces 108, 208 and the two input interfaces 112, 212 respectively of the submodules 102, 202-103, 203 with the transmission loop 40 lies in the fact that this enables the multiplexer 51 associated with its register 52 to manage emission from two modules, thereby leading to a latency time that is small in the pipeline 40, in particular because the number of registers in the pipeline is divided by two.

As a result, in certain applications, the Applicant has managed to obtain a data rate of 32 gigabits per second (Gbit/s) while using a 128 bit data structure at 250 megahertz (MHz) with 130 nanometer (nm) application-specific integrated circuit (ASIC) technology. Using higher performance technology (45 nm and smaller), it is possible to achieve performance that is much greater than 100 Gbit/s, thus making it possible to present major advantages for communication, e.g. between processor cores, and also between processor cores and the I/O means of external applications, or indeed for very high data rate routers.

The use of the multiplexer procures two major advantages, the first relating to injecting the message in the ICM and the second enabling the message to be extracted from the ICM.

Thus, each module 1, 2, . . . that emits a message over the ICM bus 40 re-reads the message. This re-reading enables the database contained in its upper layers to be fed and makes it possible to verify that the message is consistent after it has made one complete trip around the ICM. It should be observed at this stage that all of the modules connected to the ICM bus 40 receive the message and can therefore feed the databases contained in their own upper layers. This principle makes it possible to distribute data in each of the modules, leaving each module with the possibility of accepting or refusing the message. This principle makes it possible to create a distributed database among all of the modules interconnected with the ICM while guaranteeing consistency both over time (data present at the same instant) and over space (data available in all of the modules).

The entire pipeline is driven by the same clock. This therefore leads to a structure that is synchronous in which propagation times are fully under control. It is thus possible to comply with a "setup" time that corresponds to the minimum time that must be allowed between the moment when data is present at the input of the register and the moment when the clock front for loading the data reaches each register of the pipeline or each first-in-first-out (FIFO) input positioned at the input of the module 1, 2, . . . .

Furthermore, the principle on which the ICM bus is managed as implemented in the control FSM 20 makes it possible to attribute the ICM bus to a module in application of the dynamic time division multiple access (DTDMA) model that makes it possible to optimize the bandwidth of the ICM 40.

The control FSM 20 thus allocates the ICM bus to the different modules that are connected thereto in a predefined sequence.

FIG. 2 shows an example with four modules 1, 2, 3, and 4, in which the sequence is as follows: A→B→C→D→A . . . . Only the modules that have made a bus request to the control FSM 20 before their turn to speak are authorized to emit a message. Otherwise, their turn to speak is eliminated from the sequence under consideration. The message is then emitted in the following sequence. The Table below presents the conditions for passing through the control FSM 20.

Table of passing conditions

| | | |
|---|---|---|
| 11: | M1: | module 1 authorized to emit |
| 12: | !M1 and M2: | module 2 authorized to emit |
| 13: | !M1 and !M2 and M3: | module 3 authorized to emit |
| 14: | !M1 and !M2 and !M3 and M4: | module 4 authorized to emit |
| 15: | !M1 and !M2 and !M3 and !M4: | return to waiting stage |
| 21: | M2: | module 2 authorized to emit |
| 22: | !M2 and M3: | module 3 authorized to emit |
| 23: | !M2 and !M3 and M4: | module 4 authorized to emit |
| 24: | !M2 and !M3 and !M4 and M1: | module 1 authorized to emit |
| 25: | !M1 and !M2 and !M3 and !M4: | return to waiting stage |
| 31: | M3: | module 3 authorized to emit |
| 32: | !M3 and M4: | module 4 authorized to emit |
| 33: | !M3 and !M4 and M1: | module 1 authorized to emit |
| 34: | !M3 and !M4 and !M1 and M2: | module 2 authorized to emit |
| 35: | !M1 and !M2 and !M3 and !M4: | return to waiting stage |
| 41: | M4: | module 3 authorized to emit |
| 42: | !M4 and M1: | module 4 authorized to emit |
| 43: | !M4 and !M1 and M2: | module 1 authorized to emit |
| 44: | !M4 and !M1 and !M2 and M3: | module 2 authorized to emit |
| 45: | !M1 and !M2 and !M3 and !M4: | return to waiting stage |

The example given below concerns one possible way in which the device of the invention can operate, and it shows the advantage of implementing the passing conditions 15, 25, 35, and 45, which has the effect of injecting a notion of priority between the modules associated with the physical position of each module in the bus, and thus of allocating a probability of access to the bus that decreases as a function of the number of the module. It should be observed that the independence of the passing conditions may make it possible in certain applications to optimize the communication model.

In order to manage the constraints associated with managing operating reliability, each module is controlled by an external wired signal authorizing or not authorizing access to the ICM bus 40. If the signal authorizes access, the module can access the medium. If the signal does not authorize access of the module to the ICM, all of the signals requesting access to the control FSM are forced to an invalid state, which for the control FSM amounts purely and simply to eliminating the module from its management algorithms.

The principles implemented make it possible to calculate the "worst-case latency" for a module in operational mode accessing the ICM. This property is important since it makes it possible to dimension the system with respect to operational constraints. For a module, the maximum latency time is associated with the cycle time of the bus and the number of modules connected to the ICM 40.

In other words:

$$\text{latency time} = (n-1)*(\text{channel opening time} + \text{message transmission time} + \text{pipeline propagation time} + \text{channel closing time} + \text{analysis time})$$

with:
n: number of modules connected to the ICM bus 40; and
pipeline propagation time=$(n/2)*4$ nanoseconds (ns) for 130 nm ASIC technology. When using technologies that are finer, the reference time decreases perceptibly.

With this equation, it is clear that for exchanging small-sized messages (or data), the performance that is obtained is linked directly to the performance of the control FSM. As a result, particular care has been given to limit the number of clock pulses needed for opening and closing the channel and also for analysis at the end of transmission.

As mentioned above, it is also possible to manage errors, if any, by means of the control module 20, like the module defined above.

With this structure, i.e. with centralized control, the device gives rise to important advantages. In particular, it makes it possible to verify transmission errors, to manage the emission errors from the module 1, 2, . . . from which the message originates and the reception errors of each module on reception, to manage errors associated with managing the emission time for a message (detecting a message that is too short—minimum size for a message—or too long—maximum size for a message), and to detect latent failures.

In particular, the verification of transmission errors is based on using two independent mechanisms in order to verify the transmission of a message. The first mechanism uses the "Hamming" method and makes it possible to verify the integrity of each individual piece of data transmitted in the ICM and to correct an error dynamically. The second mechanism is that of verifying the integrity of a message by making use of 32 bit cyclic redundancy check (CRC) associated with the message as a whole.

If a message has thus been transmitted correctly (no error detection detected), the controlling machine makes a request to erase the message from the emission file of the message emitter module and to decrement the error counter associated with the emitter module and with the receiver modules by a unit value (this applies so long as the counter is not at 0).

In contrast, if a message is detected as being in error, the error counter associated with the module that has detected the error is incremented by eight, the other error counters are not modified, and the module immediately re-emits the message. In the event of a new error, the message is re-emitted only during the next sequence generated by the control FSM 20 so as to avoid blocking the ICM 40 with continuous emission of an erroneous message.

In the event of a message being detected as suffering an emission error for three consecutive sequences, then an "error message" is generated by the control FSM 20 together with the identifier of the erroneous message and the erroneous message is erased from the emission file in the module under consideration.

By centralizing errors that may be detected either in the emission submodule 102, 202 by the emission controlling FSM 104, 204 or in the reception submodules 103, 203 by the reception controlling FSM 109, 209 within the controlling FSM 20, it is possible to manage the error counters and to request re-emission of the message. These kinds of error are managed in the same manner as that described above.

Time management in the ICM bus 40 is controlled by a function for monitoring the emission time of each module 1, 2, . . . . Monitoring is based on controlling the speaking time of each module. If the speaking time is not complied with, the controlling FSM 20 stops the module under consideration: a module being stopped by this type of error must lead to re-initialization of the emission controlling FSM of the module without causing any message loss in the emission FIFO, leads to the error counter associated with the emission function of the module being increased by 16, and hands over to the following module without immediately re-emitting the message since it is necessary to wait for the control function of the emission module 104, 204 to be re-initialized. The message is therefore re-emitted in the following sequence.

In the event of an error counter reaching a value greater than or equal to 256, an "error message" is generated that contains the address of the module that has generated the error.

For the emission error counter, a value greater than or equal to 256 leads to the corresponding module being prevented from emitting.

For the reception error counter: a value greater than or equal to 256 leads to the error detection signal being passivated with respect to the control module 20 and prevents any message being passed up to the upper layers of the module under consideration.

In order to avoid any latent failure, a cycle life message is emitted from each module 1, 2, . . . . This message corresponds to the "status" of the module. This message is emitted by the upper layers.

Latent failures are detected by monitoring each module in a manner that makes it possible to show that the module has emitted at least its "status" message during the time period under consideration.

In order to provide such detection, a watchdog mechanism is associated in each module with a value that is slightly greater than the cycle time of the "status" message of the module. The watchdog is re-set each time a message is transmitted by the module.

With this mechanism of systematically re-emitting the module "status" message, the associated watchdog should never drop.

Nevertheless, if that should happen, an error message is then generated by the control FSM 20 with the address of the module under consideration.

The control module of the ICM is considered as being a particular module that has an "Emi_ICM" and a "Rec_ICM" function so as to emit error messages and "status" messages and receive parameter-checking commands.

It has a status made up of bits that come from the management of the bus, the states of the modules, and from its internal management.

For each module, the following bits are identified (other bits may be used as a function of applications):
- a module validity bit;
- a bit associated with detecting latent failure;
- a bit associated with the emission error counter;
- a bit associated with the reception error counter;
- a bit representative of the physical invalidation signal; and
- a bit representative of the logical invalidation signal.

This status should also be emitted cyclically so as to maintain the system surveillance function.

In the same manner, the generation of error messages in the device makes it possible to cause the errors to get back to the applications.

The invention claimed is:

1. A device for exchanging data between at least two data consuming and/or emitting applications which comprises:
    at least first and second modules, each module having input/output (I/O) means configured for being connected to an application, each module also having two internal communication submodules having respectively an emission function and a reception function;
    a control module;
    a clock for synchronizing the control module; and
    a closed-loop transmission line;
    each internal communication submodule having an emission function comprises:
        an emission finite state machine (FSM) circuit comprising means for outputting an emission request, which are connected to input means of said control module, emission authorization request input means respectively connected to output means of said control module, and an output interface for the data associated with the application that is linked thereto;
    each internal communication submodule having a reception function comprises:
        a reception finite state machine circuit comprising reception request input means for the submodule connected to output means of said control module; and
        an input interface for the data associated with the application that is linked therewith;
    the device further comprising:
    means for coupling the two input and output interfaces respectively of the submodules with said closed-loop transmission line.

2. The device according to claim 1, wherein each of the two internal communication submodules having an emission function comprises error management I/O means connected to I/O means of said control module and each of the two internal communication submodules having a reception function comprises error management request I/O means connected to I/O means of said control module.

3. The device according to claim 1, wherein the means for coupling the two input and output interfaces respectively of the submodules with said closed-loop transmission line comprise at least one multiplexer and a register associated with the multiplexer.

4. The device according to claim 3, wherein said multiplexer has three inputs, two inputs connected respectively to the two output interfaces, and another input connected in series in the closed-loop transmission line.

5. The device according to claim 1, wherein said closed-loop transmission line is constituted by an ICM bus.

6. The device according to claim 1, wherein said control module is a management module made using a finite state machine.

7. The device according to claim 1, wherein said closed-loop transmission line is a pipelined ring structure.

8. The device according to claim 1, wherein said clock is managed using one of the following techniques: static technique; dynamic technique; a combination of the two preceding techniques.

9. The device according to claim 2, wherein the means for coupling the two input and output interfaces respectively of the submodules with said closed-loop transmission line comprise at least one multiplexer and a register associated with the multiplexer.

* * * * *